United States Patent
Bienz et al.

[19]

[11] Patent Number: 5,859,509
[45] Date of Patent: Jan. 12, 1999

[54] ADJUSTABLE SPEED CONTROL FOR CHILDREN'S RIDE-ON VEHICLE

[75] Inventors: Brian Bienz, Orchard Park; Patrice M. Neaves, West Falls, both of N.Y.

[73] Assignee: Mattel, Inc., El Segundo, Calif.

[21] Appl. No.: 777,629

[22] Filed: Dec. 31, 1996

[51] Int. Cl.⁶ .............................. H02P 1/16; A63H 29/24
[52] U.S. Cl. .................. 318/139; 318/261; 318/287; 388/851; 388/838; 388/840; 446/463; 446/448; 180/338
[58] Field of Search ..................... 446/465, 460, 446/462, 463, 466, 469, 448, 447; 180/338, 333, 6.5, 22; 318/139, 256, 261, 280, 442, 287, 288, 289; 388/851, 838, 839, 840

[56] References Cited

U.S. PATENT DOCUMENTS

| | | | |
|---|---|---|---|
| 3,665,502 | 5/1972 | Means | 318/17 |
| 4,246,521 | 1/1981 | Soeda et al. | 388/820 |
| 4,558,263 | 12/1985 | Harris et al. . | |
| 4,562,893 | 1/1986 | Cunard | 180/6.5 |
| 4,639,646 | 1/1987 | Harris et al. | 318/139 |
| 4,736,648 | 4/1988 | Perego . | |
| 5,229,703 | 7/1993 | Harris | 320/2 |
| 5,270,624 | 12/1993 | Lautzenhiser . | |
| 5,350,982 | 9/1994 | Seib . | |
| 5,497,056 | 3/1996 | Kurland et al. . | |

*Primary Examiner*—John W. Cabeca
*Attorney, Agent, or Firm*—Kolisch, Hartwell, Dickinson, McCormack & Heuser

[57] ABSTRACT

An adjustable speed control for use on a children's ride-on vehicle, where the speed control includes a switch assembly interposed between the battery and the motor of the vehicle. The switch assembly is selectively operable to connect the battery to the motor in one of a number of speed configurations, including a first speed configuration and a second speed configuration. An actuator is connected to the switch assembly and manipulable by a user to allow the user to operate the switch assembly to select a particular speed configuration from among the number of speed configurations. In one embodiment, a diode is disposed in series between the motor and battery in one of the speed configurations to provide a relatively current independent voltage drop between the motor and the battery. In an alternative embodiment, a childproof cover is disposed proximal to the actuator. The cover has a first configuration in which it substantially prevents a child from manipulating the actuator to operate the switch assembly to alter the selected particular speed configuration.

18 Claims, 3 Drawing Sheets

Fig. 2b
| ROTARY SWITCH SEQUENCE | | | | |
|---|---|---|---|---|
| SPEED | A-1 | B-2 | C-3 | D-4 |
| 1-LOW | ● | | | ● |
| 2-MED | | ● | | ● |
| 3-HIGH | ● | | ● | |
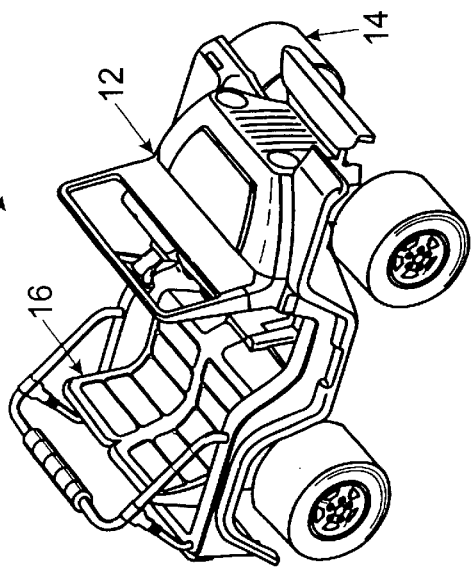
Fig. 1
Fig. 2a
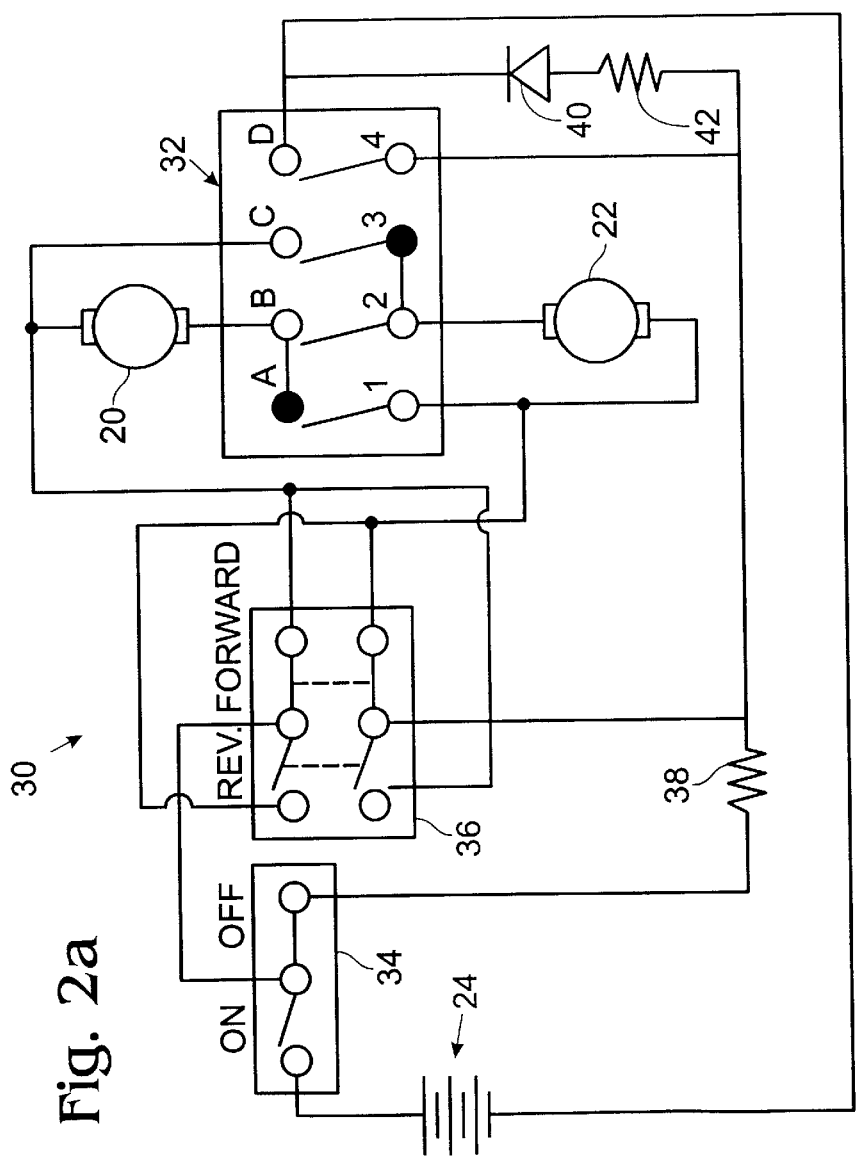

ADJUSTABLE SPEED CONTROL FOR CHILDREN'S RIDE-ON VEHICLE

BACKGROUND AND SUMMARY OF THE INVENTION

The present invention relates to children's ride-on vehicles, and more particularly to an adjustable speed control for such a vehicle.

Children's ride-on vehicles typically utilize one or two small electric motors powered by a 6 or 12-volt battery. Depending on the power output capability of the motors and how they are connected to the battery, various speeds can be achieved by the vehicle. For instance, Power Wheels™ currently manufactures three different series vehicles: the Toddler series, which are suitable for children 1–3 years old and travel at a maximum of 1 mph; the Preschool series, which are suitable for children 1½–6 years old and have a maximum speed of 2.5–3.5 mph; and, the Advanced Series, which are suitable for children 3–7 years old and have speeds up to 5 mph.

In children's ride-on vehicles, the suitability for a child of a given age is primarily determined by the speed capability of the vehicle. With young children, slower vehicles are necessary for safe operation. As children mature and become more capable drivers, they are able to operate faster vehicles with safety and confidence. In fact, vehicles for older children must offer higher speeds to maintain the children's interest.

Due to their complexity, children's ride-on vehicles are a relatively expensive toy. It is therefore important for such a vehicle to offer the longest possible useful life. In the past, useful life has primarily been limited by the maximum speed of the vehicle. A high speed vehicle cannot be used by a toddler and a low speed vehicle is not sufficiently entertaining for an older child. Although ride-on vehicles have been produced with a high and a low speed and including a high speed lock-out capability, the lock out mechanism is rather cumbersome to use, and only two speeds are offered. Preferably, for maximum utility, a children's ride-on vehicle should have at least three selectable maximum speeds. Furthermore, it should be quick and easy for a parent to select the vehicles maximum speed.

With the above problems in mind, it is a general object of the present invention to provide an adjustable speed control for a children's ride-on vehicle which can selectively limit the maximum speed of the vehicle.

It is another object of the present invention to provide such an adjustable speed control which can only be operated by an adult.

One more object of the present invention is to provide an adjustable speed control that is simple to manufacture and reliable in operation.

An additional object is to provide an adjustable speed control which presents a voltage to the motor or motors that is relatively independent of current draw.

Another object of the present invention is to provide an adjustable speed control that offers three different speed configurations.

These and other objects are satisfied by providing an adjustable speed control for use on a children's ride-on vehicle, where the speed control includes a switch assembly interposed between the battery and the motor of the vehicle. The switch assembly is selectively operable to connect the battery to the motor in one of a number of speed configurations, including a first speed configuration and a second speed configuration. An actuator is connected to the switch assembly and manipulable by a user to allow the user to operate the switch assembly to select a particular speed configuration from among the number of speed configurations. In one embodiment of the invention, a diode is disposed in series between the motor and battery in one of the speed configurations to provide a relatively current independent voltage drop between the motor and the battery. In an alternative embodiment, a childproof cover is disposed proximal to the actuator. The cover has a first configuration in which it substantially prevents a child from manipulating the actuator to operate the switch assembly to alter the selected particular speed configuration.

Many other features, advantages and additional objects of the present invention will become manifest to those versed in the art upon making reference to the detailed description which follows and the accompanying sheets of drawings in which preferred embodiments incorporating the principles of this invention are disclosed as illustrative examples only.

BRIEF DESCRIPTION OF THE DRAWINGS

FIG. 1 is a perspective view of a ride-on vehicle constructed according to the present invention.

FIG. 2a is a schematic view of an adjustable speed control according to the present invention.

FIG. 2b is a table showing the contact pattern of a switch for use with the present invention.

DETAILED DESCRIPTION OF THE PREFERRED EMBODIMENT

Figure 5:
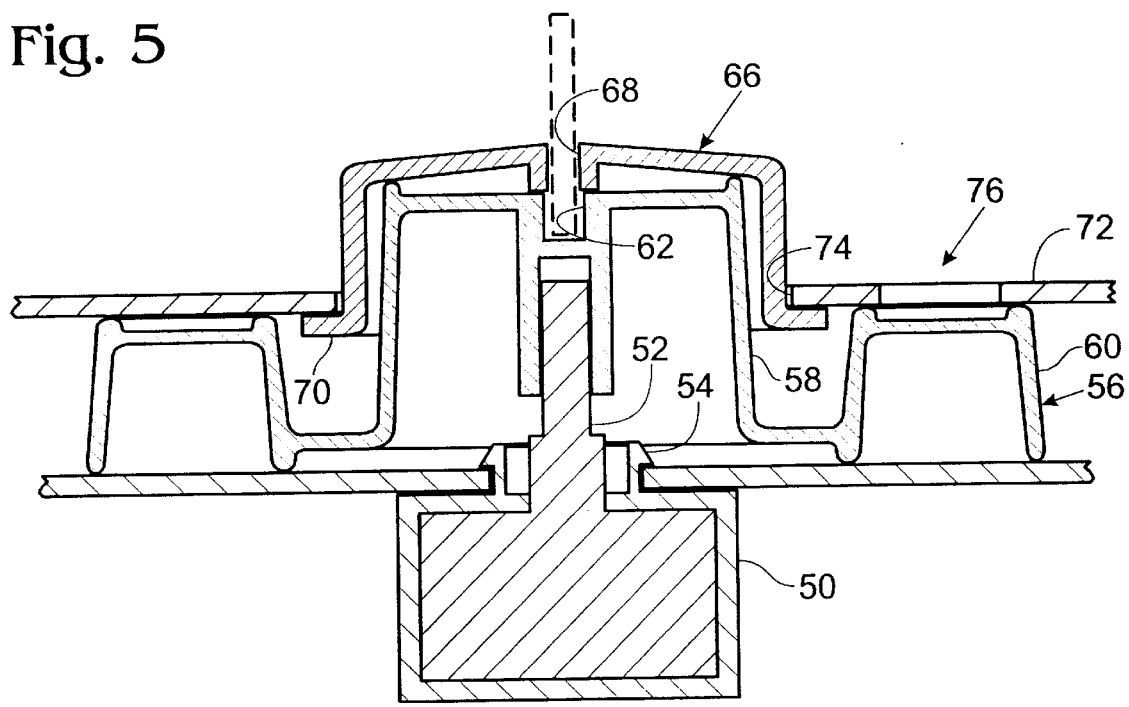
FIG. 5 is a cross-sectional view of the speed control of FIG. 4 in an assembled state.

A ride-on vehicle constructed according to the present invention is shown generally at 10 in FIG. 1. Vehicle 10 includes a body 12, wheels 14 and a seat 16. The rear two wheels are each driven by a motor, illustrated schematically at 20, 22 in FIG. 2a. Motors 20, 22 are powered by a 6 or 12 volt battery pack 24, typically disposed under the hood of the vehicle, and illustrated schematically in FIG. 2a.

Mounted to body 12 is an adjustable speed control 30, as shown schematically in FIG. 2a. Adjustable speed control 30 includes a switch assembly 32 disposed between motors 20, 22 and battery pack 24. Switch assembly 32 is designed to switch the connection between the battery and motor into one of three speed configurations. As illustrated in FIG. 2a with the speed control, a foot pedal switch 34 is the primary on/off control for the rider and is mounted in the vehicle to appear as a gas pedal. Switch 34 is simply an on/off switch and interrupts the current flow to stop the car. A direction control switch 36 is configured to switch the polarity of the voltage to the motors to provide a reverse for the vehicle. A resistor 38 is disposed in parallel with the motors to provide dynamic braking by offering a current path between the terminals of the motors when they are disconnected from the battery. This increases the resistance of the motors to free spinning and therefore slows the vehicle by braking the wheels.

Figure 3A:
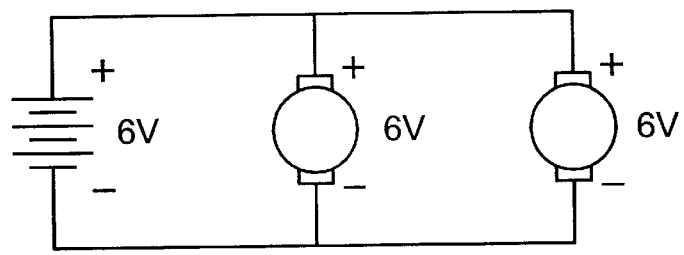
FIGS. 3a–c show schematics of three different speed configurations according to the present invention.

In the first speed configuration of the adjustable speed control, shown in FIG. 3a, the motors are wired in parallel to the battery. This results in each battery receiving the full voltage from the battery and provides the highest speed for the vehicle. As illustrated in the contact table of FIG. 2b, the high speed circuit connection of FIG. 3a is achieved by connecting contacts A and 1, contacts C and 3 and contacts D and 4.

Figure 3B:
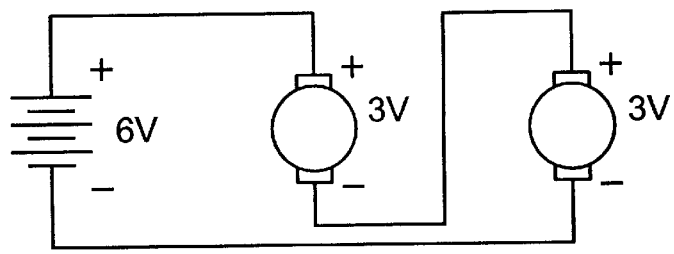

A second, medium speed configuration is shown in FIG. 3b. In this configuration, contacts A and 1 and contacts C and 3 are connected and a diode 40 and a resistor 42 are inserted in series between the battery and the motors. The diode and resistor are chosen to provide a voltage drop of about 1.5 volts at a typical current load of 10 amps. As will be understood by those of skill in the art, the voltage drop across the diode will be essentially independent of current. Thus, in grass or going uphill, when the greatest power is required and the current is highest, the motor receives approximately the same voltage as when running on a smooth surface. If a resistor were used as the primary speed regulator, the voltage to the motor would vary dramatically with the current load. For instance, with a 0.1 ohm resistor, the voltage drop would be 1 volt at the nominal current of 10 amps. However, under a heavy load, i.e., 30 amps, the resistor would have a voltage drop of approximately 3 volts. In the preferred embodiment, the resistor is used in conjunction with the diode to tune the voltage drop to the desired 1.5 volts at the nominal load of 10 amps. Without the resistor, the drop across the diode will be somewhat less than 1 volt, which would result in a higher speed than desired. Although two or more diodes could be used in series depending on the desired voltage drop, one diode is sufficient in the preferred embodiment.

Figure 3C:
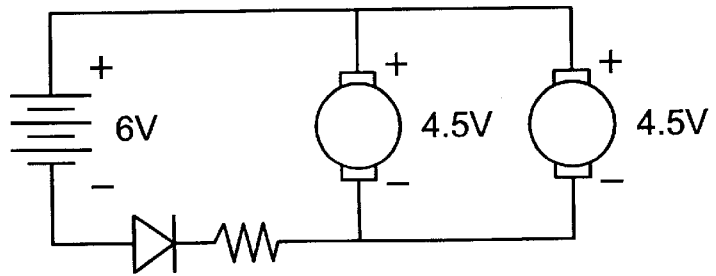

A third, low speed configuration is shown in FIG. 3c. In the low speed configuration, the motors are wired in series with each other and the battery, i.e., switch contacts B and 2 and contacts D and 4 are connected. This provides each motor with a voltage of approximately one-half of the battery voltage. For instance, with the 6-volt battery of the preferred embodiment, each motor receives approximately 3 volts, resulting in a vehicles speed approximately half that of the high speed configuration. Note that in the medium speed configuration, each motor receives about 4.5 volts, which is halfway between the high and low speed configurations.

Those of skill in the art will understand that a heavy rheostat could be used in place of switch assembly 32 to provide substantially continuously variable speed control. However, as discussed above, resistive speed controls have the disadvantage of a load dependent voltage drop. Moreover, a rheostat of the required power capacity would be relatively bulky and expensive.

Note that the foot pedal switch 34 and direction control switch 36 are disposed in the vehicle for easy access and manipulation by the rider. However, because the primary purpose of the speed control is to set the maximum speed of the vehicle to a velocity appropriate for the rider's age, switch assembly 32 is preferably operable only by an adult.

Figure 4:
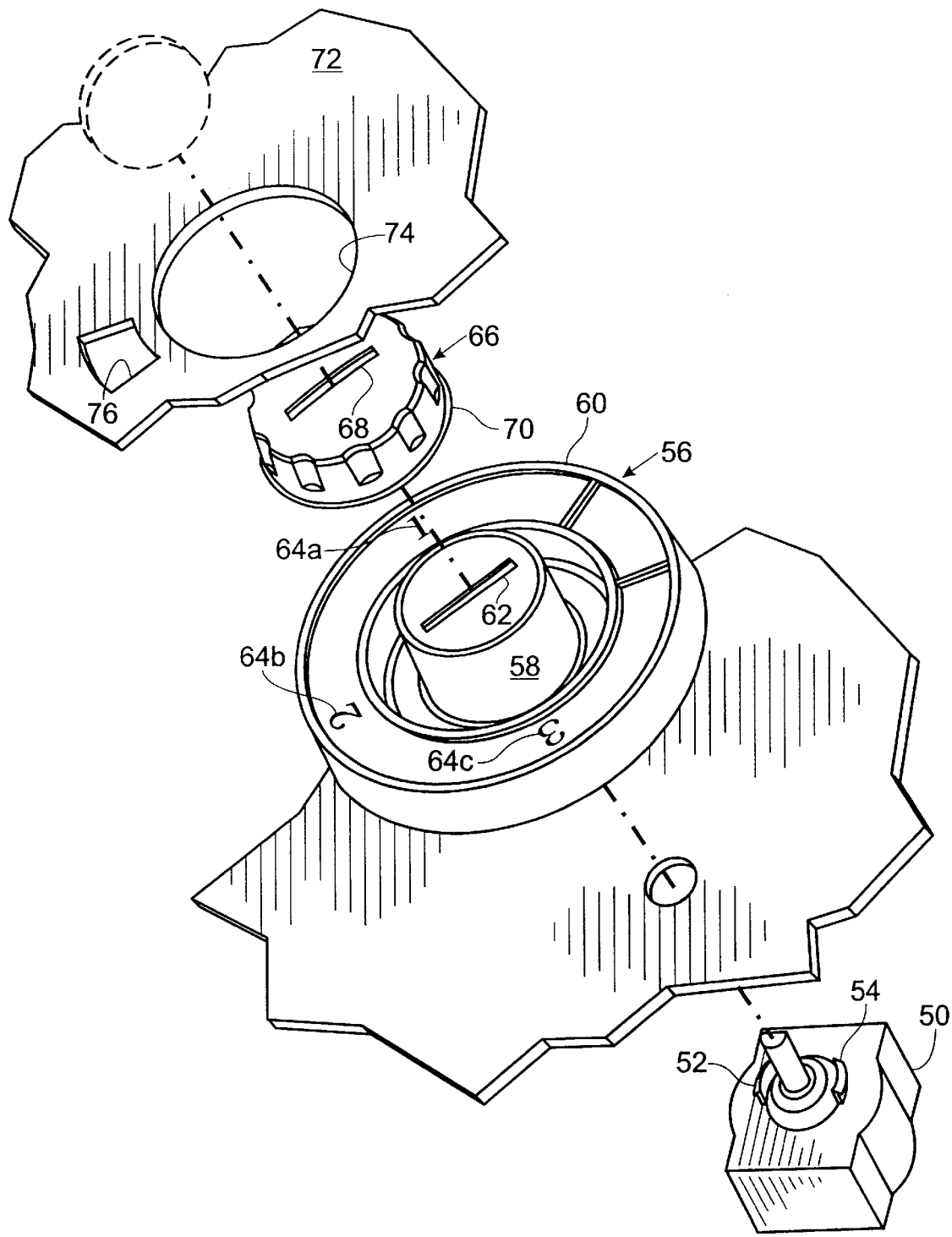
FIG. 4 is an exploded view of an adjustable speed control.

In the preferred embodiment, a tamper-resistant mechanism is used with switch assembly 32 to prevent the rider from inappropriately altering the maximum speed selection. In particular, as shown in FIG. 4, switch assembly 32 takes the form of a rotary switch 50. Rotary switch 50 has a shaft 52 rotatable to create the three different contact connection configurations, as described above and illustrated in the contact table of FIG. 2. During assembly, the shaft of the rotary switch is pushed up through a hole in the body, where it is retained by snaps 54. See FIG. 5.

An actuator 56 with a central region 58 and an outer annular region 60 is pressed onto shaft 52 to act as a knob to allow a user to rotate the shaft to select between the various speed configurations. Central region 58 includes a slot 62, and three different speed indications 64a, 64b and 64c are preferably marked on the upper side of annular region 60.

A childproof cover in the form of a cap 66 is disposed over central region 58 of actuator 56. Cap 66 is sized to fit over and rotate freely on the central region. The cap further includes a central slot 68 and an outer retaining flange 70. By inserting a key in the form of a coin or other similar object through slot 68 and into slot 62, the user is able to rotate the actuator by turning the cap. Without the key, the cover simply rotates over the actuator and it is not possible to change the setting of the switch.

Cap 66 is retained in place over actuator 56 by an outer wall 72. The cap is received in a hole 74 in the outer wall and flange 70 engages the perimeter of the hole to prevent the cap from passing therethrough. Outer wall 72 is also provided with a viewing hole 76 disposed over the annular outer portion through which the speed indications can be seen. Thus, it is not possible to remove the cap to operate the actuator. However, when the key is installed, the actuator can be rotated to change the speed configuration and an indicator corresponding to the selected configuration is visible through hole 76. This also allows the parent to visually verify quickly the current speed configuration. This is important because the vehicle may be used by several different children, and each might require a different speed setting.

Although a keyed child-proof cover is illustrated, it should be apparent that any cover operable only by an adult should be suitable for use with the present invention. For instance, the caps used on child-proof medicine bottles, some of which must be pressed down or squeezed to operate, may be used in place of cap 66. Because the primarily purpose of the adjustable speed control is to protect the youngest riders, it is most important that they not be able to alter the selected speed configuration. It is obviously a much less serious problem if an older rider slows down the vehicle than if a young rider speeds it up. Because the tamper-proof mechanism only needs to prevent unauthorized changes by young riders it only needs to be sufficiently child-resistant to prevent manipulation by a young rider.

It should be apparent that it is not necessary to use a rotary switch or control with the present invention. In particular, it is possible to implement the present invention by utilizing rocker or toggle switches. Such switches could be mounted in the body under annular region 60 and activated by one or more downwardly depending members connected to the annular region that would engage the rockers or toggles on the switches. Although it is possible to implement the invention such a fashion, the rotary switch described is preferred for simplicity and reliability.

While the present invention has been shown and described with reference to the foregoing preferred embodiment, it is to be understood by those of skill in the art that other changes in form and detail may be made therein without departing from the spirit and scope of the invention as defined in the appended claims.

It is claimed and desired to secure by Letters Patent:

1. An adjustable speed control for use on a children's ride-on vehicle with a motor and a battery, the speed control comprising:

a switch assembly interposed between the battery and the motor, the switch assembly being selectively operable to connect the battery to the motor in one of a number of speed configurations, including a first speed configuration and a second speed configuration; and an actuator connected to the switch assembly and manipulable by a user to allow the user to operate the switch assembly to select a particular speed configuration from among the number of speed configurations, where, in the second speed configuration, a diode is disposed in series between the battery and the motor so that current flowing between the battery and the motor flows primarily through the diode, to thereby provide a relatively current-independent voltage drop between the motor and the battery, and where, in the first speed configuration, current flowing between the battery and the motor bypasses the diode.

2. The adjustable speed control of claim 1, further including a childproof cover disposed proximal to the actuator, the control having a first configuration in which the cover substantially prevents a child from manipulating the actuator to operate the switch assembly to alter the selected particular speed configuration.

3. The adjustable speed control of claim 2, where the actuator is rotatable to operate the switch assembly and the cover is rotatably disposed over the actuator in the first configuration and rotatably coupled to the actuator in a second configuration.

4. The adjustable speed control of claim 3, where the cover and the actuator are configured to receive a key, and, when the key is received, the cover is rotatably connected to the actuator to allow the switch assembly to be operated by rotating the cover.

5. The adjustable speed control of claim 1, where the switch assembly provides a third speed configuration.

6. The adjustable speed control of claim 5, where the vehicle includes two motors and the first speed configuration connects the motors in parallel with each other to the battery and the third speed configuration connects the motors in series with each other to the battery.

7. The adjustable speed control of claim 6, where the motors are connected in parallel with each other and in series with the diode to the battery in the second speed configuration.

8. The adjustable speed control of claim 1, further comprising a visual indicator of the speed configuration selected.

9. The adjustable speed control of claim 8, where the visual indicator is located on the actuator.

10. An adjustable speed control for use on a children's ride-on vehicle with a motor and a battery, the speed control comprising:

a switch assembly interposed between the battery and the motor, the switch assembly being selectively operable to connect the battery to the motor in one of a number of speed configurations, including one high speed configuration and one low speed; and an actuator connected to the switch assembly and manipulable by a user to allow the user to operate the switch assembly to select a particular speed configuration from among the number of speed configurations; and a childproof cover disposed proximal to the actuator, the cover having a first configuration in which the cover substantially prevents a child from manipulating the actuator to operate the switch assembly to alter the selected particular speed configuration.

11. The adjustable speed control of claim 10, where the number of speed configurations includes a third, medium speed configuration.

12. The adjustable speed control of claim 10, where in the medium speed configuration, a diode is disposed in series between the motor and the battery.

13. The adjustable speed control of claim 11, where the vehicle includes two motors and the first speed configuration connects the motors in parallel with each other to the battery and the third speed configuration connects the motors in series with each other to the battery.

14. The adjustable speed control of claim 12, where the vehicle includes two motors connected in parallel with each other and in series with the diode to the battery in the medium speed configuration.

15. The adjustable speed control of claim 10, where the actuator is rotatable to operate the switch assembly and the cover is rotatably disposed over the actuator in the first configuration and rotatably coupled to the actuator in a second configuration.

16. The adjustable speed control of claim 15, where the cover and the actuator are configured to receive a key, and, when the key is received, the cover is rotatably connected to the actuator to allow the switch assembly to be operated by rotating the cover.

17. The adjustable speed control of claim 10, further comprising a visual indicator of the speed configuration selected.

18. The adjustable speed control of claim 17, wherein the visual indicator is located on the actuator.

* * * * *